Apr. 10, 1923.
W. M. TULLEY
LIQUID GAUGE
Filed Oct. 27, 1921
1,451,240
2 sheets-sheet 1
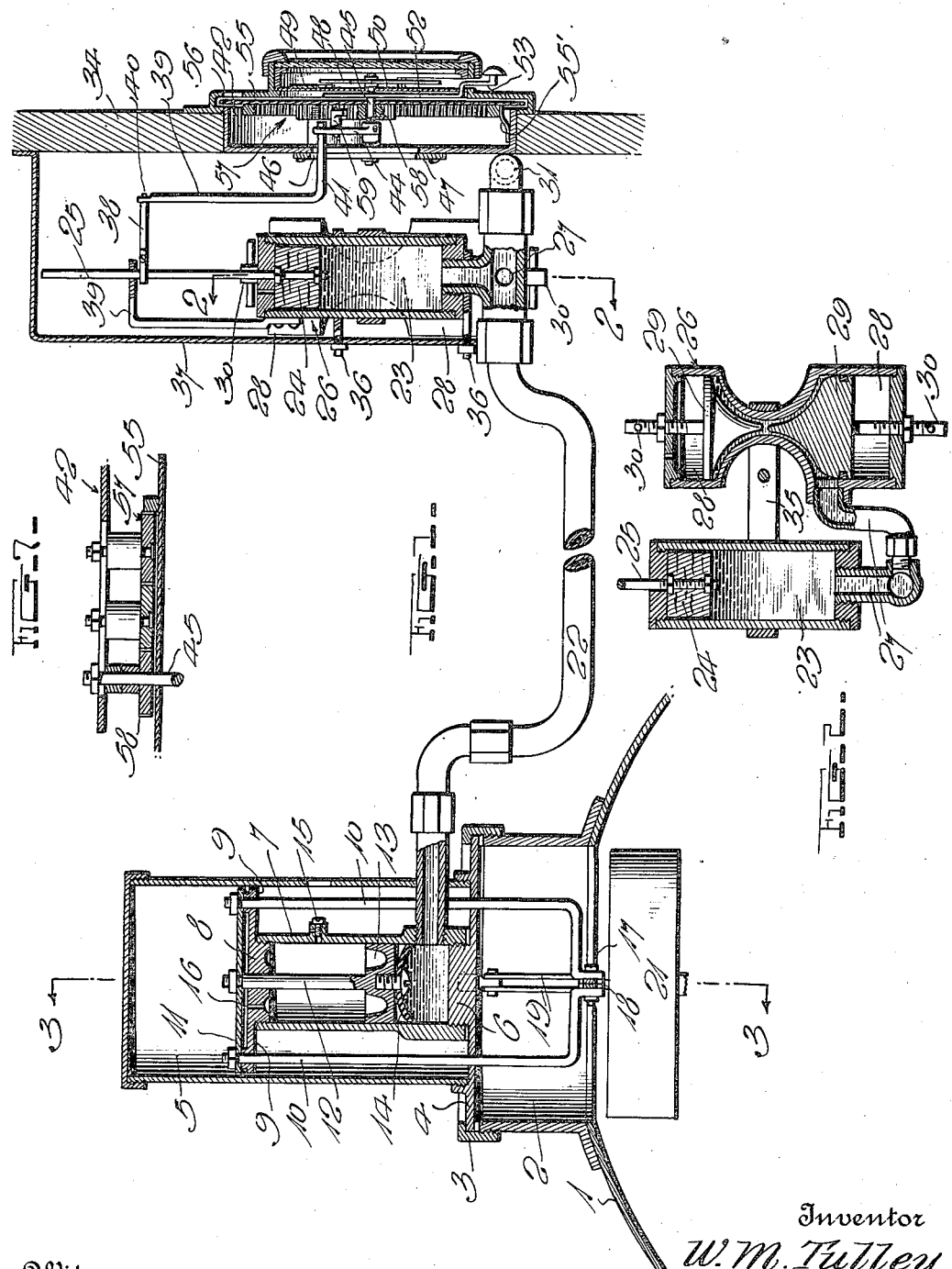
Witness
H. Woodard
Inventor
W. M. Tulley
By H. B. Wilson &co.
Attorneys

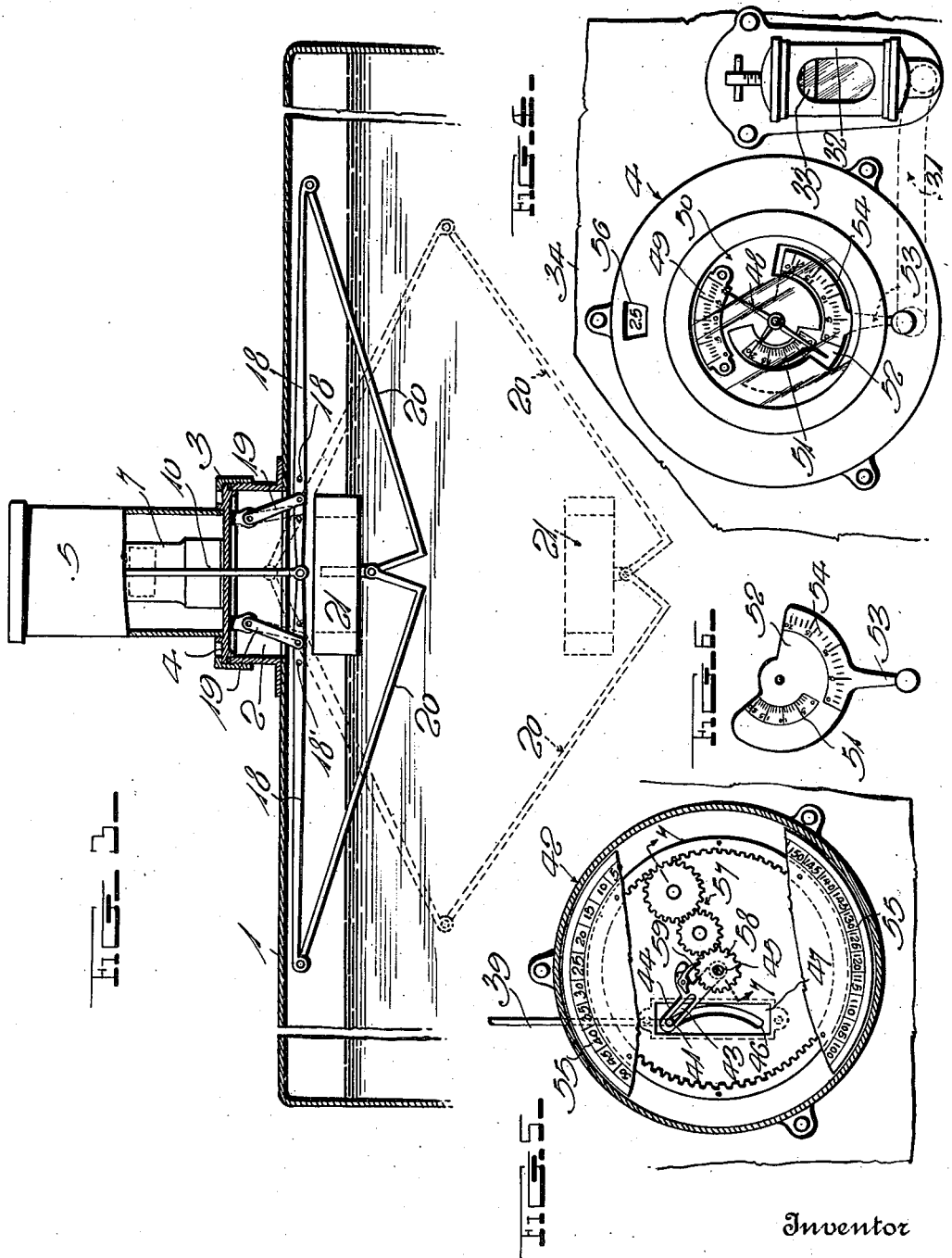

Patented Apr. 10, 1923.

1,451,240

UNITED STATES PATENT OFFICE.

WILLIAM M. TULLEY, OF CORPUS CHRISTI, TEXAS.

LIQUID GAUGE.

Application filed October 27, 1921. Serial No. 510,744.

*To all whom it may concern:*

Be it known that I, WILLIAM M. TULLEY, a citizen of the United States, residing at Corpus Christi, in the county of Nueces and State of Texas, have invented certain new and useful Improvements in Liquid Gauges; and I do declare the following to be a full, clear, and exact description of the invention, such as will enable others skilled in the art to which it appertains to make and use the same.

My invention relates to improvements in devices for showing the rise and fall of liquid in tanks, the device being particularly designed for use in connection with the gasoline tanks of automobiles, although it could be employed to equal advantage upon the fuel tanks of service stations and in fact upon any form of tank whose contents are to be gaged.

Considered more specifically, the invention comprises a float mounted within the tank and movable vertically with any variance in the liquid level, said float being connected with a piston in a cylinder to cause the movement of oil or any other suitable fluid through a passage which leads from said cylinder to another chamber in which the rise and fall of the fluid operates an indicator to show the quantity of liquid in the tank. Practically all forms of gasoline tanks for automobiles, vary in diameter at different elevations, said tanks being usually circular or elliptical in cross-section, with the result that when the tank is being filled or emptied, the float will move more rapidly while the relatively small lower and upper portions of the tank are being filled or emptied than it will travel when the comparatively large intermediate portion is receiving the liquid or is being emptied thereof. This variance in the speed at which the float travels, operates the piston connected with said float at a corresponding speed, with the result that the fluid driven from the cylinder of said piston into the indicator-operating chamber, would actuate the pointer of the indicating means at a fluctuating speed, rather than at a single uniform speed throughout its movement, were it not for a novel arrangement which is provided. The provision of this arrangement is one of the most important objects of the present invention and by the arrangement in question, the travel of the piston at a constantly varying speed, is converted into a single unvarying or uniform speed in the rise and fall of the fluid level in the above named chamber, so that the pointer of the indicating means will move steadily and the liquid measuring units on the scale or dial which coacts with said pointer may be equally spaced instead of being located at unequal distances as is now often necessary.

Another object of the invention is to provide novel indicating means whereby the exact amount of liquid supplied to the tank at any time, may be accurately determined regardless of the position at which the indicating pointer may be located at the time of introducing such liquid. This is of particular advantage in having the gasoline tank of an automobile filled at a service station, or in having a service station tank filled from a tank wagon or truck, as in either case, any shortage in the supply may be readily detected and proven without argument.

A still further aim of the invention is to provide an indicating means which will show the exact quantity of liquid which has been withdrawn from the tank, as well as the exact quantity in the tank, without the necessity of carrying out any calculating operations.

Yet another object is to provide for indicating the exact amount of liquid which has been withdrawn from the tank, for instance in a month or in any selected period.

An additional object is to provide a float operated mechanism of unique form for operating the piston of the above mentioned cylinder and in this connection, a still further aim is to provide for mounting the cylinder, its piston and the piston-operating parts upon a plate which may well take the place of the usual screw-cap employed for the filling opening of the tank.

With the foregoing and minor objects in view, the invention resides in the novel subject matter hereinafter described and claimed, the descriptive matter being supplemented by the accompanying drawings.

Figure 1 is a vertical section of my invention applied to a tank.

Figure 2 is a vertical section on the line 2—2 of Fig. 1.

Figure 3 is a vertical section on the line 3—3 of Fig. 1.

Figure 4 is an elevation of the indicating means and oil reservoir.

Figure 5 is an elevation partly in section of the indicating means.

Figure 6 is an elevation of the supplemental dial.

Figure 7 is a detail section on the line 7—7 of Fig. 5.

I will hereinafter consider that the tank is adapted to contain gasoline and that it is the usual fuel tank of an automobile, being of the well known circular or elliptical form in transverse section. From the foregoing however, it will be understood that my invention is not restricted to use upon automobiles. I may further state at this point that while any suitable medium may be employed for transmitting motion from the piston which is operated by the float, to the float or other part which moves in the chamber of the indicating means, I prefer to use oil and will hereinafter employ this term.

The numeral 1 designates the automobile tank having the usual filling opening 2 which is here shown in the form of an upstanding collar or neck. Resting upon this neck and secured thereto by a suitable ring 3, I have shown a circular plate 4 which preferably supports a housing 5 closed at its upper end. Within this housing, I have shown the plate 4 provided with a central boss 6 which forms the lower end of a vertical cylinder 7, a threaded connection being preferably employed between the boss and cylinder as shown clearly in Fig. 1. I have shown the cylinder head 8 threaded in place and provided with oppositely extending guide arms 9 through which a pair of yoke arms 10 extend slidably, the upper ends of said yoke arms being connected to a cross-head 11 secured to the upper end of the piston rod 12. This piston rod extends into the cylinder 7 and is equipped with an appropriate piston 13 which may be of any adequate form having the necessary fluid-tight contact with the cylinder wall. In some instances, an all metal piston may be used, ground to snugly fit the cylinder and perhaps provided with a suitable metal piston ring. In the construction shown, however, the front side of the piston is equipped with a flexible packing disk 14. The part shown at 15 is merely a vent-closing screw which may be removed when initially filling the apparatus with oil, so that all air which would otherwise be trapped under the piston 13, is released. At 16, another vent is shown through the cylinder head in order that no air will be trapped beneath this head to prevent proper movement of the piston.

The lower ends of the yoke arms 10 are bent inwardly toward each other and pivoted at 17 to the inner ends of a pair of levers 18, said levers being fulcrumed upon links 19 which are pivoted to and depend from the plate 4. The levers 18 are preferably formed with spaced openings 18' so that their fulcrums may be adjusted as occasion may require in adapting the invention to different tanks. A pair of converging links 20 are pivoted to the outer ends of the levers 18 and are pivoted at their inner ends to a float 21 which is adapted to ride on the gasoline within the tank 1. By this arrangement, it will be seen that as the tank 1 is filled, the float 21 will rise, thereby rocking the levers 18 in such manner as to pull downwardly on the yoke arms 10 and correspondingly move the piston 13. This movement of the piston is adapted to force oil from the lower portion of the cylinder 7 through a suitable pipe or other passage 22 into a vertical chamber 23 so that the variance of oil level in this chamber may operate an indicating mechanism through the instrumentality of a float 24 in the chamber, a stem 25 rising from said float, and numerous other operating connections hereinafter set forth.

As above mentioned, due to the fact that the diameter or distance across the tank 1 varies at different elevations, when the tank is being filled or emptied, the liquid will either rise or fall more rapidly when the comparatively small upper and lower portions of the tank are being filled or emptied, than it will when the relatively large central portion is being filled or emptied. The result is that the speed with which the float 21 moves, is not uniform or constant. This is necessarily true also of the piston 13, in view of the fact that the latter is operated from the float. It thus follows, that the flow of oil from the cylinder 7 to the chamber 3 will not be uniform at all points throughout the travel of the float and it would be very undesirable to operate the indicator from such a non-uniform supply of oil, without the provision of some rectifying means, so that even though the supply of oil to the chamber 23 is not uniform, the speed at which the level of oil in this chamber will rise or fall, may be unvarying. I have attained this result in a very novel manner, by placing a rectifying chamber 26 by the side of the chamber 23 and placing the lower ends of the two chambers in communication by means of appropriate pipe connections 27, so that through the action of gravity, the level of oil in the chambers 23 and 26 will always be uniform. The diameter of the chamber 26 however, is not uniform at different elevations, but varies to either take any surplus oil supplied to the chamber 23 by the piston 13, or to furnish any oil which would otherwise be lacking in said chamber 23, thereby insuring that the level of oil in this chamber may rise or fall at a single unvarying speed, causing the float 24 to similarly move and operate the indicating means in the most advantageous manner.

In the preferred form of construction, the chamber 26 is cylindrical at its ends as indicated by the reference numerals 28 and decreases in diameter from its ends to its center, preferably in the curved manner shown in Fig. 2. A piston 29 slides in each end 28 of the chamber 26 and each of these pistons is of substantially conical construction to substantially conform to the internal shape of the intermediate portion of the chamber. By means of suitable set-screws or the like 30, the pistons 29 may be adjusted so that the capacity of the chamber 26 at different elevations, may be varied in any manner which may be necessary in meeting conditions encountered.

Before proceeding further with the description, it will be well to explain more clearly the exact manner in which the rectifying chamber 26 operates. In so doing, we will consider Figs. 1 and 2. The float 21 is raised about to the maximum, the piston 13 is at the lower end of the cylinder, and both chambers 23 and 26 are filled with oil to the same level. Assuming now that liquid is drawn from the tank 1, it will be seen that as the relatively small upper portion of the tank empties, the float 21 moves downwardly at a comparatively rapid pace, thereby drawing oil into the lower end of the cylinder 7 through the piping 22. Were it not for the rectifying chamber 26, the oil drawn from the chamber 23 would be sufficient to cause a rather rapid descent of the float 24, that is rapid when compared to the travel of this float at a later stage in the emptying of the tank 1. By using the chamber 26, however, it will be seen that instead of withdrawing the necessary quantity of oil totally from the chamber 23, some of this oil is withdrawn from the rectifying chamber, the level in the two chambers always remaining the same. As the descent of the float 21 varies in speed, it is necessary that correspondingly varying amounts of oil be drawn from the rectifying chamber 26, and this result is effectively produced by the construction described. To summarize the effect of the construction in question, the rectifying chamber insures movement of the float 24 at a constant unvarying speed, regardless of the fact that in traveling from one end of its stroke to the other, the float 21 gradually decreases its speed to the center of the tank and then increases its speed toward the other side thereof.

The numeral 31 designates a pipe leading from the connections 27 to an oil reservoir 32 having a screw-operated plunger 33 by means of which the supply of oil in the system may be replenished whenever necessary should any leakage take place.

The numeral 34 designates a portion of the instrument board or dash of the automobile, adjacent whose unexposed side, the chambers 23 and 26 may well be mounted by any suitable means, these chambers being here shown as carried by a suitable frame 35 which is secured by bolts or the like 36 within a casing, 37, said casing being in turn suitably secured to the instrument board. Extending from the stem 25 toward the instrument board is an arm 38 which is rigidly connected to said stem, a suitable guide 39 being provided for the latter to prevent it from tilting laterally under the weight of the arm 38 and associated parts. A rod 39 depends from the arm 38 and is by preference pivoted thereto at 40, the lower end of said rod being provided with a lateral finger 41 which extends into the casing 42 of the indicating mechanism. The free end of finger 41 is received in a slot 43 in a lateral operating arm 44 with which a pointer operating shaft 45 is provided, said shaft being rotatably mounted in any preferred manner in the casing 42. The finger 41 also passes through a curved slot 46 in a plate 47 which is secured to the back wall of the casing 42 or in some instances, this slot may be formed directly in the casing. The provision of slot 46, moves the finger 41 in the slot 43 so as to change the leverage which the rod 39 exerts upon the shaft 45 during vertical movement of said rod, thereby causing uniform rotation of the shaft 45 which could not be obtained if the rod 39 were pivoted directly to the arm 44.

The outer end of the shaft 45 carries a three-pointed pointer 48, one of whose ends co-acts with a scale 49 on a fixed dial 50 with which the casing 42 is provided. Scale 49 is divided into liquid measuring units corresponding to the number of units which the tank 1 will hold, gallons being preferably the standard of measurement and it will be understood that as the tank is filled, the pointer 48 advances along the scale 49, but recedes along this scale as the tank empties.

In order that the exact quantity of gasoline supplied to the tank 1 at any time, may be definitely seen without the necessity of performing any calculations, I provide another scale 51 on a movable dial 52 which is pivotally mounted upon the shaft 45 and provided with an operating handle 53 extending to the exterior of the casing 42 so that said dial may be set whenever required. When the tank is being filled, the dial 52 is turned so that the zero reading thereof is under the adjacent end of the pointer 48. Then, as the tank is filled, the pointer advances along the scale and the point at which its movement ceases will show the exact number of gallons which has been placed in the tank so that it is absolutely impossible for the salesman to "cut the purchasers short" without detection.

It is often desirous to know the number of gallons which have been used from the tank, in addition to the present contents of said tank, and in order that this result may be obtained without calculating, a scale 54 is provided for co-action with the third end of the indicator 48, said scale advancing counterclockwise, whereas the scale 49 advances clockwise. When the tank is full for instance and this condition is shown by the relation of the pointer with the scale 49, the handle 53 is moved to so adjust the dial 52 as to position the zero reading of the scale 54 at the co-acting end of the pointer. Then, as the fuel is consumed from the tank, the pointer moves down the scale 54 and indicates the exact consumption.

The amount of fuel consumed, for instance, in a month, may be determined by the use of my invention, the details described below being preferably followed for this purpose. A circular dial 55 is provided with numbers designating gallons, which are visible through an opening 56, one at a time, and said dial 55 may be driven by a train of gearing 57 from the shaft 45. This train includes a gear 58 which is loose upon the shaft and a dog 59 is employed to operate this loose gear from the arm 44. One example of the operation of this mechanism will be sufficient, in which case, we will assume that the tank has been filled and the float 24 and arm 44 thus raised to the position shown in Fig. 5. As the tank is now emptied, the dog 59 clicks idly over the teeth of the gear 58 and does not operate the train 57, but when the tank is again filled, the arm 44 moves to its upper extreme and causes the dog 59 to operate the train of gearing 57, so that the dial 55 is advanced and adds the contents of the tank to the number previously appearing through the opening 56. This shifting operation of the dial 55 could well be effected upon descent of the arm 44, simply by reversing the dog 59, as will be readily understood. The dial 55 is held against retrograde movement by a friction brake 55' of any suitable form.

From the foregoing, taken in connection with the accompanying drawings, it will be seen that I have provided an extremely efficient arrangement for carrying out the objects of the invention, yet that regardless of simplicity, a highly advantageous apparatus has been provided. As the invention is not restricted to the details disclosed, it will be understood that numerous minor changes may be made within the scope of the invention as claimed.

I claim:

1. A liquid gauge comprising a pump including a liquid carrying cylinder and a piston therein moving from one end of the cylinder to the other, a chamber supplied with liquid from said pump, an indicator operated by rise and fall of the liquid level in said chamber, and an auxiliary liquid receiving chamber communicating with the first mentioned chamber and varying in cross sectional area throughout its length whereby the level of the liquid in the last mentioned chamber may be caused to rise and fall at an even rate of speed when the piston in the cylinder is moved at a gradually changing rate of speed.

2. In a liquid gauge, the combination of a fluid chamber, an indicator operated by rise and fall of the fluid level in said chamber, liquid-actuated means for supplying fluid to said chamber at a non-uniform rate of speed, and a rectifying chamber communicating with the lower end of said first named chamber, said rectifying chamber being decreased in cross sectional area from its ends toward its center, for the purpose set forth.

3. In a liquid gauge, the combination of a fluid chamber, an indicator operated by a rise and fall of fluid in said chamber, means for supplying fluid to said chamber at a non-uniform rate of speed, a rectifying chamber communicating with the lower end of said first named chamber, said rectifying chamber being of different cross-sectional area at different elevations, and means independent of the various cross-sectional areas of the rectifying chamber for varying the capacity of said chamber at different elevations.

4. In a liquid gauge, the combination of a fluid chamber, an indicator operated by rise and fall of the fluid level in said chamber, liquid-actuated means for supplying fluid to said chamber at a non-uniform rate of speed, a rectifying chamber communicating with the lower end of said first named chamber, and a body adjustable in said rectifying chamber to vary the capacity thereof.

5. In a liquid gauge, the combination of a fluid chamber, an indicator operated by rise and fall of the fluid level in said chamber, liquid-actuated means for supplying fluid to said chamber at a non-uniform rate of speed, and a rectifying chamber communicating with the lower end of said first named chamber being of different cross sectional areas at different elevations, for the purpose set forth, and substantially conical pistons adjustable in the ends of said rectifying chamber to vary the capacity thereof.

6. In a liquid gauge, a dial having units of liquid measurement, a pointer associated with said dial, means for advancing said pointer along said dial as the liquid level rises and for retrogradely moving said pointer as the level falls, and a supplemental dial having units of liquid measurement, said supplemental dial being movable with respect to the other dial and the pointer for coaction with the latter.

7. In a liquid gauge, a dial having units of liquid measurement, a pointer associated with said dial, means for advancing said pointer along said dial as the liquid level rises and for retrogradely moving said pointer as the level falls, and a supplemental dial having units of liquid measurement, said supplemental dial being pivotally mounted on the pivot of said pointer, and being adjustable with respect to said pointer and the first named dial for coaction with the former.

8. In a liquid gauge, a casing, a fixed dial therein having units of liquid measurement, a pivoted pointer in said casing cooperable with said dial and means for operating said pointer, and a supplemental dial pivotally mounted and having a scale cooperable with said pointer, said supplemental dial having a handle extending to the exterior of the casing for adjusting it with respect to said pointer.

9. In a liquid gauge, a dial having scales positioned in spaced relation, one advancing in one direction while the other advances in the other direction, and a pointer pivotally mounted between the scales and having portions extending in operative relation to said scales respectively.

10. In a liquid gauge, a dial having substantially opposed scales of liquid measurement, one advancing clockwise and the other counter-clockwise, and a pointer pivoted between said scales and having oppositely extending portions cooperable with said scales respectively.

11. A liquid measuring device for use in connection with a tank comprising a fixed dial, a shaft having a pointer cooperable with said dial to show the rise and fall of liquid under successive filling and emptying operations, said shaft having a lateral operating arm formed with a longitudinal slot, a fixed plate parallel with the plane in which said arm swings, said fixed plate having a curved slot, and a movable operating member having a finger received and movable in the slots of said arm and plate, for the purpose set forth.

12. A liquid gauge comprising a vertical cylinder closed at its lower end and adapted to be mounted on a liquid tank, a piston in said cylinder having an upstanding piston rod, a yoke at the exterior of the cylinder connected with said piston rod, opposed levers pivoted to said yoke and adapted to be fulcrumed in the tank, links connected to said levers, and a float carried by said links, said cylinder having an outlet adapted to lead to a liquid level indicator.

13. A liquid gauge comprising a plate adapted to close an opening in a liquid tank, a cylinder supported by said plate in an upright position, a piston in said cylinder having an upstanding piston rod, a yoke on the exterior of said cylinder connected to said piston rod and extending downwardly through said plate, links depending from and pivoted to said plate, a pair of levers fulcrumed to said links and connected to said yoke, links connected to said levers, and a float carried by said last named links.

In testimony whereof I have hereunto set my hand.

WILLIAM M. TULLEY.